June 24, 1969     N. B. HERSCHMAN     3,451,877
ARTICLES FOR CREATING UNIDIRECTIONAL VISION EFFECTS
Filed Sept. 7, 1965
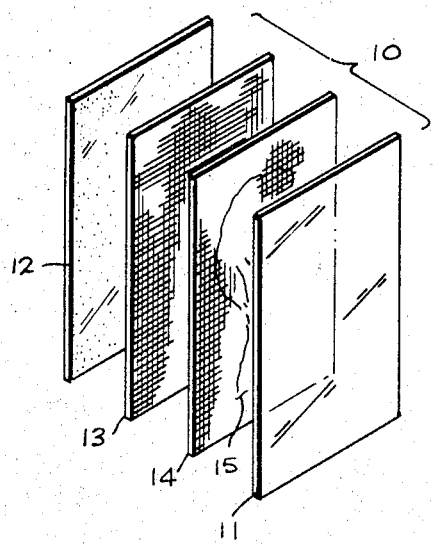
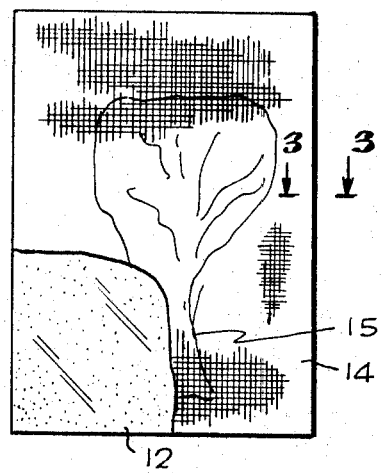
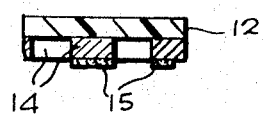
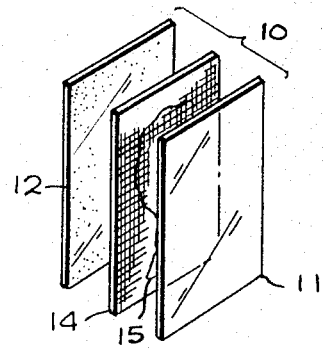
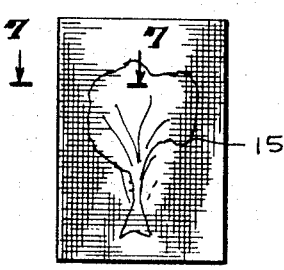
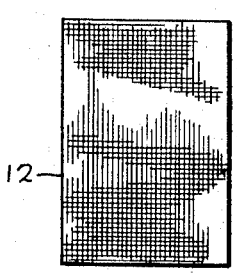
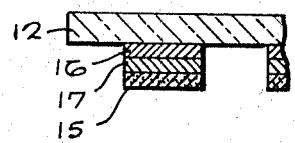
INVENTOR.
NATHAN B. HERSCHMAN
BY Allan M. Shapiro
ATTORNEY

United States Patent Office 3,451,877
Patented June 24, 1969

3,451,877
ARTICLES FOR CREATING UNIDIRECTIONAL VISION EFFECTS
Nathan B. Herschman, Los Angeles, Calif.
(7331 Independence Ave., Canoga Park, Calif. 91303)
Filed Sept. 7, 1965, Ser. No. 485,222
Int. Cl. B44f 1/00
U.S. Cl. 161—3                                    5 Claims

ABSTRACT OF THE DISCLOSURE

A panel assembly permits relatively undiminished vision therethrough from one side, while greatly diminishing vision therethrough from the opposite side. An opaque open mesh grid defines a plurality of light-porous openings and is provided with a bright, eye-attractive light reflective image on an obverse side thereof. A darkly colored translucent panel of reduced transparency is positioned on the reverse side of the grid. In one embodiment, the panel assembly is provided with a second opaque grid of the same dark color as the translucent panel between the translucent panel and the first opaque grid in registration therewith. In another embodiment, the opaque grid is provided directly on a surface of the translucent panel with a light reflective layer provided on the other side of the opaque areas of the grid and the brightly image positioned on the light reflective layer.

---

This invention relates to methods and articles for creating unidirectional vision effects and, more particularly, to such methods and articles whereby a decorative and/or structural panel or screen is provided with means for permitting relatively undiminished vision therethrough from one side thereof while tending to greatly diminish vision therethrough from the opposite side thereof.

Panels having bi-directional visual effects are playing a starring role in traditionally appealing aspects of building and landscape design and it has been found desirable to construct such panels so that they are practical to manufacture and install as well as aesthetically pleasing. The use of unidirectional vision panels in connection with building screens, wall panels, special effects and the like will have considerably increased interest for decorative and artistic purposes.

Panels or panes which prohibit or restrict vision when viewing by an observer through only one side generally take the form of conventional "one-way mirrors" and the like. However, such conventional panels or panes are greatly restricted in use because of their inability to withstand breakage, expense in manufacture and extremely limited decorative and artistic characteristics.

The novel method and article of the present invention obviate the problems and difficulties encountered with such conventional panels or screens by providing a panel having an opaque grid defining a plurality of light-porous openings therethrough and an eye-attractive light reflective image displayed effectively upon an obverse side of such grid whereby vision through the panel from the reverse side is obstructed only by said grid but vision through the panel from the obverse side is both obstructed by said grid and also effectively diminished by the visual sense stimulation occasioned by said image, one embodiment of the present invention employing a dark transparent sheet on the reverse side of the panel for only partially blocking transmitted light but greatly diminishing the light reflected to the viewer from the reverse side, another embodiment of the present invention employing a clear transparent sheet superimposed on the obverse side of the displayed image for maximizing the light reflected toward the viewer from the obverse side, and still another embodiment employing successively superimposed grid-like structures for achieving the foregoing effects.

Therefore, it is a primary object of the present invention to provide a novel unidirectional vision panel adapted to effectively obscure vision therethrough from one side thereof while, at the same time, permitting relatively unobscured vision therethrough from the opposite side thereof.

Another object of the present invention is to provide a unidirectional vision panel having an eye-attractive image displayed on one side thereof which has the effect of preventing vision through the panel to an area at the rear of said panel while at the same time permitting relatively unrestricted vision through said panel from the rear side of said panel to the obverse area.

Still another object of the present invention is to provide a unidirectional vision panel which is economical to manufacture and offers a variety of applications for decorative and artistic displays.

Still another object of the present invention is to provide a novel unidirectional vision panel which is of a highly ornamental character and which lends itself readily to meet with a variety of desired artistic forms.

Yet another object of the present invention is to provide a unidirectional panel or screen of sandwich construction employing a transparent, dark or colored backing for a grid sheet having a decorative pattern or arrangement displayed on one side thereof whereby the decorative pattern operates as an image for eye concentration when viewing the panel from the pattern-displaying side to obscure vision through the panel and yet provides substantially greater vision through the panel when viewing from the dark-backed side thereof.

The features of the present invention which are believed to be novel are set forth with particularity in the appended claims. The invention, both as to its organization and manner of operation, together with further objects and advantages thereof, may best be understood by reference to the following description, taken in connection with the accompanying drawings, in which:

FIGURE 1 is an exploded front perspective view of a novel vision panel in accordance with the present invention illustrating four sheets or layers which form the composite panel wherein two grid sheets are employed, one of which bears the pattern or image thereon;

FIGURE 2 is a front elevational view of another embodiment of the vision panel having a portion broken away to illustrate an underlying sheet or layer;

FIGURE 3 is an enlarged sectional view of a portion of the panel taken along the line 3—3 in FIGURE 2;

FIGURE 4 is an exploded front perspective view of another embodiment of the present invention wherein the vision panel of FIGURES 2 and 3 is provided with an additional front sheet;

FIGURE 5 is a front elevational view of still another embodiment of the present invention wherein the eye-attractive image or pattern is shown as being applied to a grid sheet via intermediate layers;

FIGURE 6 is a rear elevational view of the panel shown in the embodiment of FIGURE 5; and FIGURE 7 is an enlarged sectional view of a portion of the panel shown in FIGURE 5 as taken along the line 7—7 and illustrating the eye-attractive image carried on the grid via the intermediate layers.

For the purpose of definition, it should be understood that the term "grid" as used herein refers to an open mesh of a substantially uniformly intersecting arrangement of opaque areas formed of closely spaced broken or continuous lines, bands, materials or the like which do not inherently cause visual concentration thereon and define light porous spaces or areas therebetween. Further, the terms "pattern" and "image" as used herein refer to non-uniform arrangements of spots, lines, bands, materials and the like so as to create a flat or curvilinear plane of focal concentration insofar as the human eye is concerned. The term "translucent" is used herein to define a light pervious member of reduced transparency which permits a clear image to be seen therethrough with reduced light intensity and color range.

Referring now to FIGURE 1, an embodiment of a novel unidirectional vision panel of the present invention is indicated by numeral 10 and comprises a sandwich construction of layers which include a front and a rear layer 11 and 12 respectively which preferably are composed of any suitable transparent or translucent material such as plastic or glass, for example. The rear layer 12 is darkly colored so as to present a dark backing to the panel 10. Between the front and rear layers, there is provided a grid member or sheet 13 having a plurality of light porous openings defined by an opaque grid and may take the form of a close wire mesh, a fabric, a relatively thick pane with holes therethrough, or may be suitably presented by a grid-like pattern of lines marked on a sheet of transparent or translucent plastic or glass or the like. The grid serves to divide the member 13 into a plurality of light transmitting areas and light opaque areas. Located between the grid sheet 13 and the front sheet 11, there is provided a main grid sheet or layer 14 which may be referred to as a pattern layer which has inscribed or marked on the illustrated front surface or obverse side thereof a suitable decorative arrangement presented by a pattern or image such as indicated by the numeral 15. The composition of the pattern layer 14 may be the same as that of the other grid sheet 13.

The decorative pattern may be composed of any suitable light reflective materials, paints, etc. which are applied directly over or disposed only on the corresponding portions of the light opaque areas formed by the grid, the technique for application thereof depending upon the materials employed. While grids 13 and 14 preferably are substantially identical in spacing of their light transparent and opaque areas so as to be capable of relatively exact registration therebetween, it should be noted that they may differ from each other in their arrangements so that greater opacity occurs than would be present with only one such grid, preferably by having the light opaque areas larger on the rearward grid 13 than the image-bearing grid 14.

In a preferred embodiment of the present invention, in order to minimize the degree of obstruction of vision through the panel 10 by an observer at the rear thereof, the opaque areas of the grid 13 have the same dark color as that of the transparent panel 12, thereby effectively preventing conscious ocular perception of the grid 13. Conversely, and particularly so when grids 13 and 14 are in registration, the preferably opaque areas of grid 14 have a light color for enhanced light reflection so as to provide an effective background for the image 15.

Means may be provided for suitably retaining the various layers of the sandwich construction together to form a composite panel such as a frame (not shown) which may engage the edge marginal regions of the composite panel to hold the same together or any suitable fastener or retaining means may be employed. However, it is to be understood that the specific relationship of the panels with respect to one another as set forth above is important to the operation and effectiveness of the present invention.

Furthermore, although the composite panel is made up of substantially flat sheets and layers, it is to be understood that the sheets or layers may all be curved or that the panel once constructed may be bent, shaped or curved to suit or achieve specific special artistic effects without departing from the present invention.

As shown in FIGURES 2 and 3, the sandwich construction of the unidirectional vision panel takes the form of a two layer construction wherein the decorative pattern or image 15 is displaced directly upon the obverse side of the grid sheet 14, with the latter superposed on the dark transparent rear sheet 12, no other elements being present.

As seen in FIGURE 4, the panel 10 of FIGURES 2 and 3 is provided with the clear transparent front sheet 11 of FIGURE 1 to further enhance the light-reflective properties of the obverse side.

As shown in FIGURES 5-7, another embodiment of the present invention is illustrated whereby a decorative pattern 15 is applied directly to the dark transparent rear sheet 12 via a plurality of intermediate grid layers such as is more clearly illustrated in FIGURE 7. Inner layer 16 is preferably opaque and of a relatively dark color and is carried directly on the front or obverse surface of the rear sheet 12 in the form of a grid. A next intermediate layer 17 is of a lighter color than the base inner layer 16 and is applied directly to the inner layer with the identical grid form. Next, the decorative pattern 15 is applied to the intermediate grid layer 17. It is to be understood that the intermediate layers may follow the contour and shape of the decorative pattern rather than the grid-like pattern and thus represent an alternate means by which the decorative pattern may be applied to the surface of the sheet 12. The layers may be applied to the sheet 12 as well as applied on each other by any suitable means such as by adhesive, painting, spraying or the like.

With reference to actual use of the unidirectional vision panel of the present invention, the composite panel 10 is arranged either indoors or outdoors in such a manner that the decorative pattern is avilable for observation by an observer from the front of the panel and permits a background, which may be a particular scene or structure residing to the rear of the panel, to be hidden from view of the observer. Furthermore, should the observer be behind the panel, his vision through the panel will not be diminished and any objects or events occurring in the front of the panel will be available to the observer's view.

The present invention appears to involve the combination of two phenomena, namely, the phenomenon whereby an observer's eye will react more strongly to the brighter of two light sources so that a brighter light source in the foreground will obscure a relatively darker light source in the background thereof and, secondly, a distinct image or recognizable or expected shape in the foreground will attract the eye and provide a focal plane so as to effectively prevent visual focusing upon an object therebehind.

The use of the unidirectional vision panel of the present invention appears to employ these two basic phenomena but, however, without necessarily employing two substantially different ambient light levels on opposite sides of the panel. It should be noted that vision is clearer when looking through the composite panel 10 from the rear or colored panel side (which may be referred to as the dark or reverse side) than from the decoratively patterned side (which may be referred to as the light or obverse side). This effect will be achieved even though the composite panel is held close to the eyes, although the differential effects become even more pronounced as the composite panel is moved further from the eye. Also, if the lights in the room are in the back of the observer, the image reflection from the light side is so pronounced as to almost completely obscure vision therethrough (as in a "one-way mirror," for example). Now, by viewing the reverse or dark side of the composite panel 10, the pattern or image is not visible so that the eye will focus through the grid and beyond the composite panel to objects and events happening on the other side thereof.

Therefore, the composite unidirectional vision panel of the present invention represents a combination of a dark transparent layer and a relatively light-porous grid having an eye-attractive image representing an image for focal concentration on the obverse side of the grid whereby the optical effects occur of relative transparency when viewed from the reverse side of the composite panel and relative opacity when viewed from the opposite or obverse side of the combination.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A panel assembly which tends to diminish vision therethrough in the obverse direction and tends to permit vision therethrough in the reverse direction, comprising:
   (a) a translucent panel of reduced transparency having a dark color;
   (b) an open mesh grid disposed on the obverse side of said translucent panel, said grid having opaque grid areas defining a plurality of light porous spaces therebetween; and
   (c) a bright, eye-attractive, light reflecting image disposed on corresponding portions of the obverse side only of said light opaque areas only of said grid so that said image is visible from the obverse direction and at least tends to be obscured by said light opaque areas of said grid from the reverse direction;
   (d) whereby an observer from the reverse direction sees light transmitted from the obverse direction through the light porous grid spaces, such light being colored by the dark color; and
   (e) whereby an observer from the obverse direction sees primarily only the reflected light from the image.

2. A panel assembly as recited in claim 1, wherein said opaque areas of said grid are disposed directly on the obverse surface of said translucent panel.

3. A panel assembly as recited in claim 2, wherein a light colored layer is disposed on said obverse side only of said opaque areas only of said grid, and wherein said image is disposed on said light colored layer with the reflected light from said unimaged portions of said layer serving as a background therefor.

4. A panel assembly as recited in claim 1 having a second open mesh grid having opaque grid areas of dark color defining a plurality of light porous spaces therebetween, said second grid being disposed between said translucent panel and said first grid, said opaque areas of said first grid being of light color, and said opaque areas of said first grid being in registration with said opaque areas of said second grid so as not to be visible from said reverse direction.

5. A panel assembly as recited in claim 4 wherein said opaque areas of said second grid are the same dark color as said translucent panel.

References Cited

UNITED STATES PATENTS

| | | | |
|---|---|---|---|
| 1,717,738 | 6/1929 | Schwarz | 40—135 |
| 2,306,387 | 12/1942 | Huntley | 40—135 |
| 2,931,117 | 4/1960 | Bosworth et al. | 40—135 |

J. STEINBERG, *Primary Examiner.*

U.S. Cl. X.R.

161—6, 113, 413